(12) United States Patent
Travis

(10) Patent No.: US 8,581,831 B2
(45) Date of Patent: *Nov. 12, 2013

(54) SCANNING BACKLIGHT FOR FLAT-PANEL DISPLAY

(75) Inventor: Adrian Robert Leigh Travis, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/084,551

(22) Filed: Apr. 12, 2011

(65) Prior Publication Data

US 2011/0187293 A1 Aug. 4, 2011

Related U.S. Application Data

(63) Continuation of application No. 10/559,891, filed on Dec. 6, 2005, now Pat. No. 7,944,428.

(30) Foreign Application Priority Data

Jun. 6, 2003 (GB) .................................. 0313044.0
Jun. 4, 2004 (WO) ................ PCT/GB2004/002386

(51) Int. Cl.
   *G09G 3/36* (2006.01)
(52) U.S. Cl.
   USPC ......................................................... 345/102
(58) Field of Classification Search
   USPC .................... 345/87–104, 204; 349/61–71; 362/551–561
   See application file for complete search history.

(56) References Cited

U.S. PATENT DOCUMENTS

| 4,978,952 | A | 12/1990 | Irwin | 345/102 |
| 5,887,964 | A | 3/1999 | Higuchi et al. | 362/620 |
| 5,921,652 | A | 7/1999 | Parker et al. | 362/601 |
| 6,249,328 | B1 | 6/2001 | Fukuzawa et al. | |
| 6,448,951 | B1 | 9/2002 | Sakaguchi et al. | |
| 6,704,071 | B2 | 3/2004 | Wang | 349/71 |
| 6,744,416 | B2 | 6/2004 | Mizutani et al. | |
| 6,808,281 | B2 | 10/2004 | Ho | 362/600 |
| 2002/0030772 | A1 | 3/2002 | Nauta et al. | 349/61 |
| 2003/0090455 | A1 | 5/2003 | Daly | |

FOREIGN PATENT DOCUMENTS

| EP | 0663600 | 7/1995 | | |
| JP | 2003-187623 | 7/2003 | | |
| KR | 10-2000-7001126 | * 3/2001 | ............ | G02F 1/1335 |
| WO | WO 99/63394 | 12/1999 | | |

(Continued)

OTHER PUBLICATIONS

Machine translation of KR 10-2000-7001126.*

(Continued)

*Primary Examiner* — Sumati Lefkowitz
*Assistant Examiner* — Robert E Carter, III
(74) *Attorney, Agent, or Firm* — L. Alan Collins; Collins & Collins Intellectual, LLC

(57) ABSTRACT

An illuminator for a flat-panel display comprises a tapered slab waveguide 1 co-extensive with the display, a light source 2-4 arranged to inject light into an edge of the waveguide so that it emerges over the face of the waveguide, and means for scanning the light injected into the wedge so that different areas of the panel are illuminated in turn. Preferably the light source is a set of rows of LEDs, each row injecting light at a different range of angles so that it emerges over different areas of the waveguide 1.

16 Claims, 3 Drawing Sheets

(56) References Cited

FOREIGN PATENT DOCUMENTS

| WO | WO 01/72037 A1 | 9/2001 |
|---|---|---|
| WO | WO 02/21042 | 3/2002 |
| WO | WO 03/040616 | 5/2003 |

OTHER PUBLICATIONS

W. Frank, Communication pursuant to Article 94(3) EPC, Ref. P85700EPPC/CSG, Date Jun. 8, 2008.

N. Fisekovic, "Improved Motion-Picture Quality AM-LCDs Using Scanning Backlight", Proc. Asia Display/IDW 2001, Oct. 2001, p. 1637-1640, XP009036254.

International Search Report issued in priority application PCT/GB2004/002386 (Oct. 13, 2004).

Fisekovic N. et al. "Scanning Backlight Parmaters for Achieving the Best Picture Quality in AM LCD," Eurodisplay 2002 pp. 533-535, Jan. 1, 2002.

Kongslie, K.F. et al., "A Syncronously Strobed Backlight for Improved Video-Rate STN performance," 25 SIDInternational Symposium Digest of Technical Papers pp. 155-158 (Jun. 14, 1994).

Written Opinion issued in priority application PCT/GB2004/002386 (Oct. 13, 2004).

EP Summons to attend oral proceedings for Application No. 04736068.0-2205/1634119, Reference P85700EPPC/CSG, Aug. 12, 2011.

KR Notice of Preliminary Rejection for Application No. 10-2005-7022918, Reference No. 324003.06, Dec. 20, 2010.

* cited by examiner

SCANNING BACKLIGHT FOR FLAT-PANEL DISPLAY

CROSS-REFERENCE TO RELATED APPLICATIONS

This application is a Continuation of, and claims priority from, U.S. application Ser. No. 10/559,891, filed Dec. 6, 2005, that is incorporated herein by reference in its entirety and that claims priority from International Application No. PCT/GB2004/002386, filed Jun. 4, 2004, that is also incorporated herein by reference in its entirety, that was published in the English language on Dec. 16, 2004 as WO 2004/109380, and that claims priority from UK Application No. 0313044.0, filed Jun. 6, 2003, that is also incorporated herein by reference in its entirety.

This invention describes a way of making displays, and is in particular intended to make possible a liquid-crystal display which can show moving images without smear.

Liquid-crystal displays are more compact than cathode ray tubes and so are replacing them for television and for use in computer displays. However, televisions are often used to show sport and other fast-moving images, and the images of moving objects such as balls and people get smeared on liquid-crystal displays. This is not because the liquid crystal switches slowly, but because the emission from a liquid-crystal pixel is sustained, whereas that from a cathode-ray tube is pulsed, as will now be explained.

A liquid-crystal display conventionally comprises a liquid-crystal panel and a backlight. A picture is formed on the panel by spatial modulation of the transparency of the liquid crystal, and the picture is made visible to the viewer by the backlight. The backlight must be thin, but fluorescent tubes that are thin yet large enough to illuminate a liquid-crystal panel are rather delicate. The backlight often therefore comprises a thin transparent plastic wedge, and a cylindrical fluorescent tube adjacent to the thick end of the wedge—see for instance EP-A1-663600 (Nitto Jushi).

Light emitted from the fluorescent tube over a range of directions enters the wedge through its thick end, and then propagates along the axis of taper by total internal reflection off the wedge/air interfaces, as shown in FIG. 1. Because the waveguide is tapered, i.e. its faces are not quite parallel, each time a ray reflects off one side of the wedge, the ray's angle relative to the normal of the opposite side decreases. Eventually the critical angle is reached and the ray emerges into air. Unless they have been scattered, rays emerge from the wedge in a direction close to the plane of the wedge/air interface. A prismatic film is therefore often placed over the surface of the wedge in order to deflect the rays so that their average direction is perpendicular to the wedge/air interface.

The material out of which the wedge is made is often designed so that it slightly scatters light. The effect is that the direction of light which emerges from the wedge is diffuse so that the image on the liquid-crystal panel can be seen over a wide field of view. One thus obtains a uniform illumination.

If an eye follows the image of a ball as it moves across a screen then, in order to avoid blur, the image of the ball should shift by one pixel every time the centre of attention of the eye shifts by one pixel. However, the moving image on a video display is made of still pictures called frames which are renewed at a set rate, namely every sixtieth of a second. Suppose that the image of a moving ball is being displayed, and that the image shifts ten pixels between each frame. At the start of each frame, the image of the ball coincides instantaneously with the centre of attention of the eye, but with each tenth of a frame period the centre of attention of the eye shifts by one pixel whereas the image of the ball remains where it is. The image of the ball therefore becomes blurred by up to ten pixel widths.

Cathode ray tubes avoid blur because pixels are pulsed, so that the eye only sees the image of the ball at the start of each frame, or when the pixels are addressed, when the image coincides with the centre of attention of the eye. The eye sees nothing further until the image again coincides with the centre of attention of the eye, and the dark period in between is imperceptible because the eye cannot detect flicker at periods of a sixtieth of a second. One way of eliminating blur in a liquid-crystal display is to configure the liquid crystal so that it behaves like a cathode ray tube by relaxing into a dark state soon after being addressed. However, blocking light for large parts of the duty cycle wastes power. Another way of eliminating blur, as used in video projectors, is to scan illumination across the liquid-crystal display, but this requires bulk optic systems which are acceptable in video projectors but unacceptable within the flat form factor that makes liquid-crystal displays so attractive.

This invention aims to provide a flat-panel scanning illuminator which comprises a transparent wedge, and means for scanning the direction of light injected into the thick end of the wedge.

According to the invention an illuminator for a flat-panel display comprises a slab waveguide of the tapered type co-extensive with the display, a light source arranged to inject light into an edge of the waveguide so that it emerges over the face of the waveguide, and means for scanning the light injected into the wedge so that different areas of the panel are illuminated in turn. Preferably the light source is a set of rows of LEDs, each row injecting light at a different range of angles so that it emerges over different areas of the waveguide. The rows of LEDs are parallel to the input edge of the tapered waveguide.

In principle it would be possible to have any subdivision of the input light, though clearly it should be synchronised with the addressing of the display pixels. One could arrange two or more parallel strip lights, if they could be controlled at the necessary speed, or even a single light source with one or more shuttering or diverting means, whether electronic, optical or mechanical. In general the scanning of the input light would be in blocks corresponding to a number of rows on the display, though in theory a subdivision along rows would not be impossible.

The illuminator could be used as a light source for any kind of backlit display, though liquid-crystal displays are ideally suited.

The waveguide may be literally tapered, i.e. so that it has a cross-section, in the direction of propagation through it before emergence at the face, that tapers down; or it may achieve the same effect by "optical tapering", e.g. using variation in refractive index.

To aid understanding a specific embodiment of the invention will be given by way of example, referring to the accompanying drawings, in which.

Figure 1:
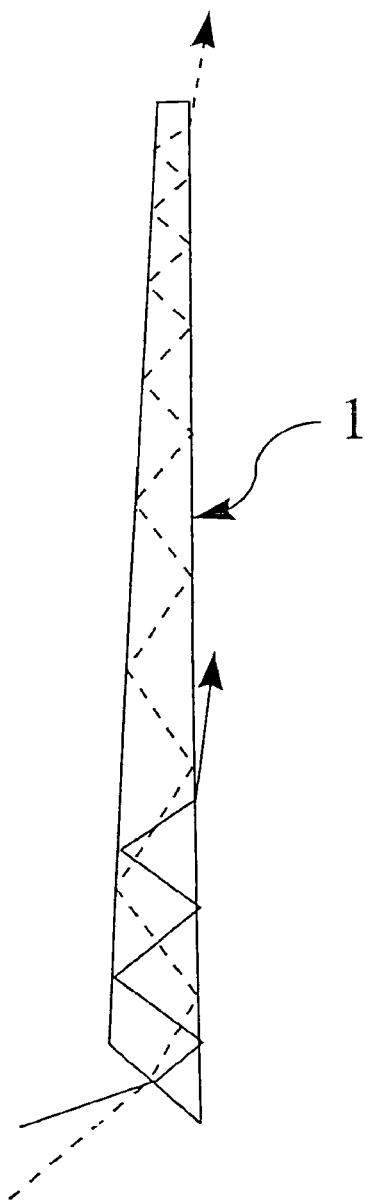
FIG. 1 shows how the angle at which light is injected into a wedge alters the position at which the light emerges.
Figure 2:
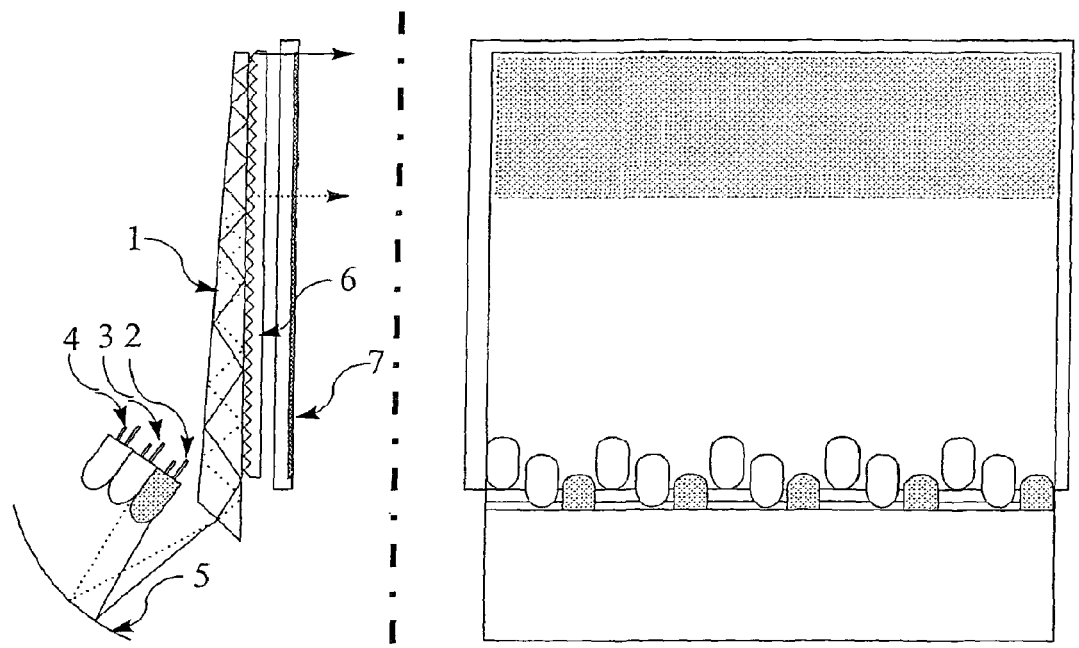
FIG. 2 shows in side and front views how three lines of light-emitting diodes can be placed at different positions within the focal plane of a mirror so that each illuminates a different segment of the liquid-crystal display.

As shown in FIG. 2, a wedge-shaped, generally flat rectangular waveguide 1, which is entirely transparent and free of scattering inclusions, has its thick end, here at the bottom edge of the display, illuminated by linear LED arrays 2, 3 and 4 which are in the focal plane of a cylindrical mirror 5. Each array consists of a row of LEDs of diameter about 5 mm, extending over the width of the display, which may be perhaps 30-100 cm.

The parallel light reflected off the mirror enters the thick end 10 of the wedge, which is bevelled so as to be roughly perpendicular to the incoming light, and bounces towards the thin end at ever shallower angles until it escapes, at a position determined by its angle of input. The steeper the angle of input, the earlier the light escapes. This principle is described in EP-A1-663 600 (Nitto Jushi), for instance. However, here the input light is subdivided over the range of input angles; the size of the LED arrays and the taper of the wedge are chosen so that the light from the LED (i.e. from a single row) escapes over only a third of the height of the display. The three adjacent rows between them thus cover the full height of the display. (Words such as "height", "horizontal" and so forth are of course used with reference to a normally oriented display.)

This backlight assembly is used for a standard liquid-crystal display as follows. Once the top third of a frame has been written to the liquid-crystal display, the first LED array 2 is illuminated. Light from this array is collimated into a set of angles which, after injection into the thick end of the wedge 1, go on to emerge from the top third of the wedge 1. Here the rays should be bent to the normal by a sheet of prismatic film 6 and diffused, either before or after passing through the liquid-crystal display 7.

Figure 3:
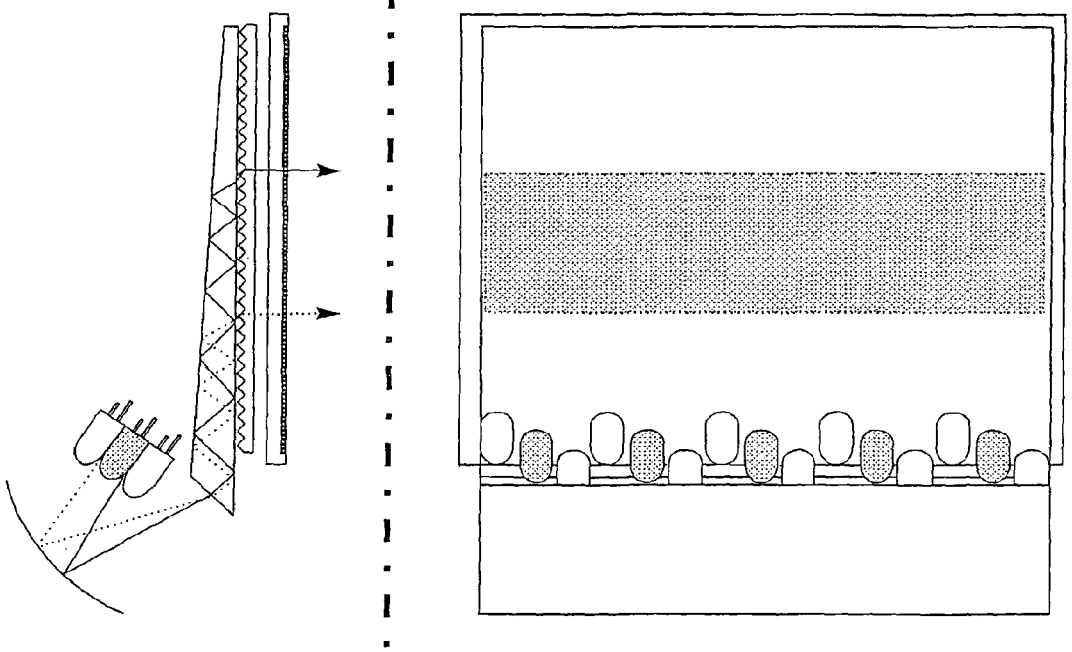
FIG. 3 is the same as FIG. 2 but shows how the screen is illuminated a third of a frame later.

Once the centre third of the frame has been written to the liquid-crystal display, the first LED array 2 is switched off and the second LED array 3 is switched on, as shown in FIG. 3. Light from the second LED array 3 is collimated into an adjacent set of angles which, after injection into the thick end of the wedge, go on to emerge from the centre of the wedge.

Figure 4:
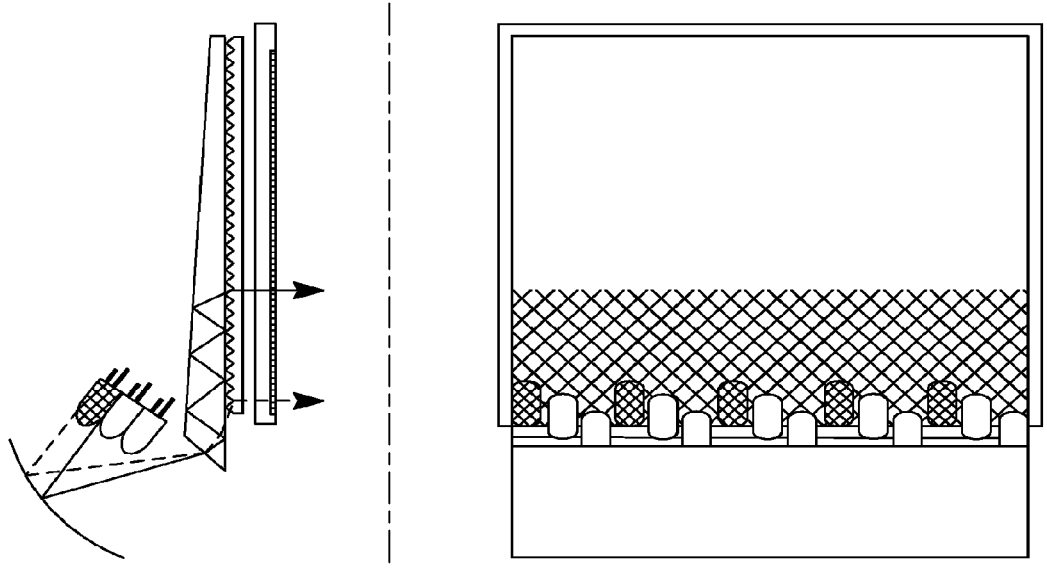
FIG. 4 is the same as FIG. 2 but shows how the screen is illuminated two-thirds of a frame later.

Lastly, once the bottom third of the frame has been written to the liquid-crystal display, the middle LED array 3 is switched off and the third LED array 4 is switched on so as to illuminate the bottom third of the liquid-crystal display. Simultaneously to this, the top third of the next frame will begin to be written to the top third of the liquid-crystal panel, and so on. This is shown in FIG. 4.

The controller for the LEDs is synchronised with that of the display so that each row 2, 3, 4 is illuminated when its corresponding third of the panel is addressed, and it remains lit for a third of the cycle time. Clearly there could be two, four or in principle any number of rows. For a standard 14-inch screen subdivision into three is found to give an acceptably low level of smear.

Colour pictures require red, green and blue LED's, and it is conventional to interleave these in order to mix light of different colours before it reaches the liquid-crystal display. Furthermore, it is desirable generally to extend the thick end of the wedge beyond the base of the liquid crystal display so that there is a length over which mixing can take place, and so that the illumination is uniformly white at the base of the liquid-crystal panel and beyond. This extended section may need to be longer with the scanning-illumination scheme because LED's illuminating a particular region of the liquid-crystal panel at a particular wavelength will be more widely spaced than is conventional. If necessary, the extended section can be folded behind the liquid-crystal panel with prisms, so the extra length of the extended section does not create an unacceptable change in form factor.

Figure 5:
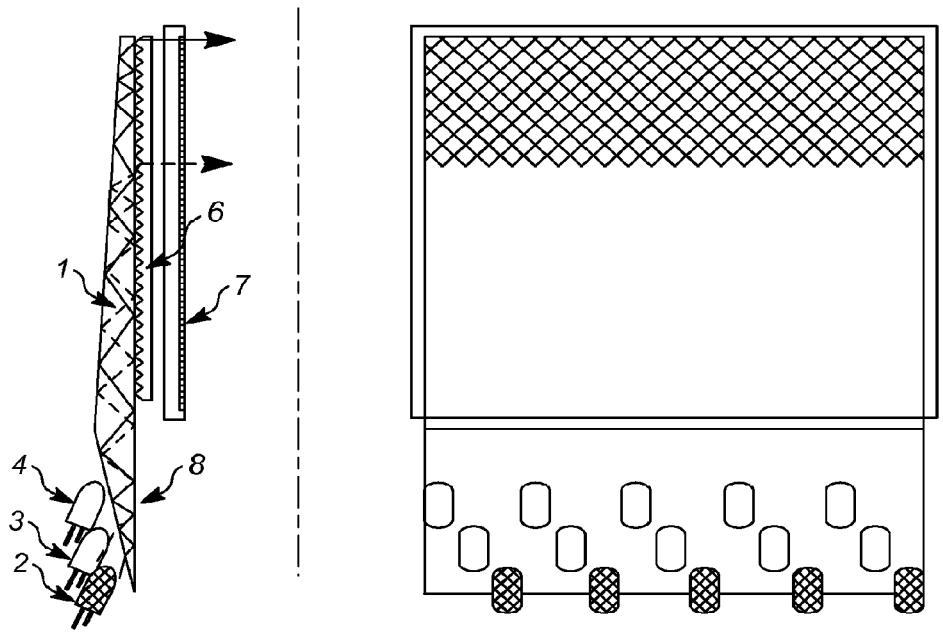
FIG. 5 shows in side and front views how a pair of wedges with shared thick ends can be used to direct light from three lines of light-emitting diodes to different areas behind a liquid-crystal panel.

The cylindrical mirror is a slightly bulky element and it may be advantageous to exchange it for a second short wedge 8 which acts as an input element for the illumination wedge 1 as shown in FIG. 5. The input wedge 8 acts in reverse, so that light injected near the tip of wedge 8 from LED 2 forms rays with a shallow angle at the interface between input wedge 8 and display wedge 1, and therefore emerges near the tip of the display wedge 1, whereas light injected near the base of the input wedge 8 forms rays with a steep angle at the interface between that wedge and the display wedge 1, so the light emerges near the base of the display.

In the example described the scanning of the illumination is vertical. This is preferred because the scanning of the display is also vertical, i.e. row by row, but a division in the horizontal direction is conceivable. LEDs are also preferred as light sources because they switch on and off fast, but other sources could be used.

The example also uses geometrically tapered wedge-shaped waveguides, but the same effect could be achieved with "optically tapered" waveguides, made for instance using GRIN techniques. For convenience such displays are referred to as "tapered".

The invention claimed is:

1. A method of backlighting a display, the method comprising:
    turning on a light array of N light arrays in response to display data having been written to a corresponding horizontal row of N horizontal rows of the display, the turned-on light array configured for backlighting predominately the corresponding horizontal row of the display, the backlighting based on light emitted from the turned-on light array being injected into an input edge of a waveguide that is configured for causing the injected light to emerge from the waveguide predominately over the corresponding horizontal row of the display, where each of the N light arrays is configured for emitting light that is subdivided over a range of input angles, and where the input edge of the waveguide is configured for causing the subdivided light from the each of the N light arrays to emerge, based on the range of input angles, from the waveguide predominately over a corresponding one of the N horizontal rows of the display;
    turning off the turned-on light array in response to display data having been written to another horizontal row of the N horizontal rows of the display; and
    repeating the method in response to the turning off.

2. The method of claim 1 further comprising bending the emerging light to be substantially perpendicular to a viewing face of the display.

3. The method of claim 1 further comprising diffusing the emerging light.

4. The method of claim 1, the input edge of the waveguide substantially co-extensive with a back of the display along a horizontal axis of the back of the display.

5. The method of claim 4, the waveguide disposed behind the back of the display linearly tapered along a vertical axis of the back of the display.

6. The method of claim 1, each of the N light arrays comprising a row of light emitting diodes.

7. The method of claim 1, each of the N light arrays configured for backlighting predominately a distinct corresponding one of the N horizontal rows of the display.

8. The method of claim 1, each of the N light arrays comprising a row of interleaved red, green, and blue light emitting diodes.

9. An illuminator system for a display, the illuminator system comprising:
- a controller configured for turning on a light array of N light arrays in response to display data having been written to a corresponding horizontal row of N horizontal rows of the display, the turned-on light array configured for backlighting predominately the corresponding horizontal row of the display, the backlighting based on light emitted from the turned-on light array being injected into an input edge of a waveguide that is configured for causing the injected light to emerge from the waveguide predominately over the corresponding horizontal row of the display, where each of the N light arrays is configured for emitting light that is subdivided over a range of input angles, and where the input edge of the waveguide is configured for causing the subdivided light from the each of the N light arrays to emerge, based on the range of input angles, from the waveguide predominately over a corresponding one of the N horizontal rows of the display;
- the controller further configured for turning off the turned-on light array in response to display data having been written to another horizontal row of the N horizontal rows of the display; and
- the controller further configured for repeating the turning on and then the turning off in response to the turning off.

10. The system of claim 9 further comprising a film configured for bending the emerging light to be substantially perpendicular to a viewing face of the display.

11. The system of claim 9, further comprising the input edge configured for scattering the emitted light so that the emerging light is diffuse.

12. The system of claim 9, the input edge of the waveguide substantially co-extensive with a back of the display along horizontal axis of the back of the display.

13. The system of claim 12, the waveguide disposed behind the back of the display and linearly tapered along a vertical axis of the back face of the display.

14. The system of claim 9, each of the N light arrays comprising a row of light emitting diodes.

15. The system of claim 9, each of the N light arrays configured for backlighting predominately a distinct corresponding one of the N horizontal rows of the display.

16. The system of claim 9, each of the N light arrays comprising a row of interleaved red, green, and blue light emitting diodes.

* * * * *